United States Patent
McGillan

(10) Patent No.: US 11,338,627 B1
(45) Date of Patent: May 24, 2022

(54) METHODS AND SYSTEMS FOR TIRE HEALTH MONITORING

(71) Applicant: Samsara Networks Inc., San Francisco, CA (US)

(72) Inventor: Glen Phillip McGillan, San Francisco, CA (US)

(73) Assignee: Samsara Networks Inc., San Francisco, CA (US)

( * ) Notice: Subject to any disclaimer, the term of this patent is extended or adjusted under 35 U.S.C. 154(b) by 0 days.

(21) Appl. No.: 17/498,688

(22) Filed: Oct. 11, 2021

Related U.S. Application Data

(60) Provisional application No. 63/140,708, filed on Jan. 22, 2021.

(51) Int. Cl.
  *B60C 23/04* (2006.01)
  *B60C 23/06* (2006.01)
  (Continued)

(52) U.S. Cl.
  CPC ........ *B60C 23/0488* (2013.01); *B60C 11/243* (2013.01); *B60C 23/0479* (2013.01);
  (Continued)

(58) Field of Classification Search
  CPC ............ B60C 23/0408; B60C 23/0496; B60C 23/0612; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003;
  (Continued)

(56) References Cited

U.S. PATENT DOCUMENTS 8,047,061 B2 * 11/2011 Shin ................. G01M 1/22
 73/66
9,387,734 B1 * 7/2016 Alhazmi ............. B60C 23/0459
(Continued)

*Primary Examiner* — Andre J Allen
(74) *Attorney, Agent, or Firm* — Nicholson, De Vos, Webster & Elliott, LLP

(57) ABSTRACT

A method of monitoring one or more wheels of a vehicle is described. The method includes receiving first accelerometer measurements of a first accelerometer mounted on the vehicle's first wheel when the vehicle is moving during an interval of time, determining based on the first accelerometer measurements a first path followed by the first accelerometer when the vehicle is moving during the interval of time, determining based on the first path that the vehicle's first wheel is out of balance with respect to an axle of the vehicle's first wheel, and responsive to determining that the vehicle's first wheel is out of balance, transmitting to a user device a first alert that the vehicle's first wheel is out of balance.

20 Claims, 8 Drawing Sheets

(51) Int. Cl.
*B60C 11/24* (2006.01)
*B60C 23/20* (2006.01)

(52) U.S. Cl.
CPC ........ *B60C 23/0489* (2013.01); *B60C 23/061* (2013.01); *B60C 23/20* (2013.01); *B60C 2200/04* (2013.01)

(58) Field of Classification Search
CPC .......... B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 23/0422; B60C 23/0423; B60C 23/0466; B60C 2220/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0054; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/006; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/022; G01M 99/004; G01M 3/002; G01M 3/04; G01M 7/02; G01M 9/06

USPC ................................................ 73/146–146.8

See application file for complete search history.

(56) References Cited

U.S. PATENT DOCUMENTS

| | | | |
|---|---|---|---|
| 10,794,788 B2* | 10/2020 | Ishitoya | .................. G01M 1/04 |
| 2004/0172181 A1* | 9/2004 | Lu | ......................... B60C 23/061 |
| | | | 340/442 |
| 2017/0320363 A1* | 11/2017 | Hung | .................. B60C 23/0489 |
| 2018/0003593 A1* | 1/2018 | Siegel | ..................... G01S 19/49 |
| 2020/0033220 A1* | 1/2020 | Raad | .................. G01M 17/013 |

* cited by examiner

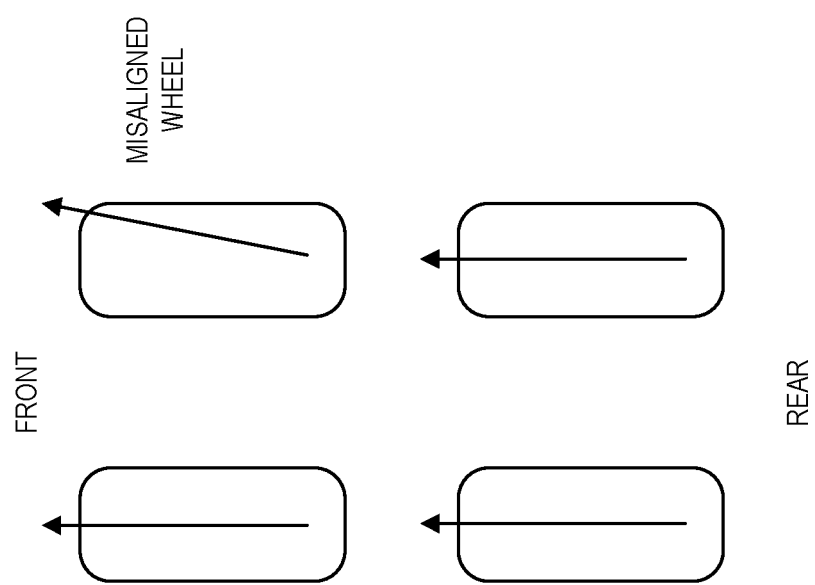

METHODS AND SYSTEMS FOR TIRE HEALTH MONITORING

CROSS-REFERENCE TO RELATED APPLICATIONS

This application claims the benefit of U.S. Provisional Application No. 63/140,708, filed Jan. 22, 2021, which is hereby incorporated by reference.

TECHNICAL FIELD

One or more embodiments relate to the field of vehicle monitoring; and more specifically, to methods and systems for tire health monitoring.

BACKGROUND ART

Tire damage can contribute to major maintenance and safety issues for vehicles. In fact, tires are one of the leading expenses for fleets of vehicles. Tires to be used in vehicles of a fleet should be selected based on the type of climate and terrain that the vehicles will operate in. Once the type of tires is selected for the vehicles, a maintenance program can be put in place. For example, a tire pressure monitoring system (TPMSs) can be used to monitor the pressure of the tires of a vehicle. However, determining the air pressure of a tire is one of many aspects that affect the health of a tire in a vehicle. Alignment of a tire, balance of a tire, and/or tread depth of a tire are other parameters that affect the performance of a tire.

BRIEF DESCRIPTION OF THE DRAWINGS

The following figures use like reference numbers to refer to like elements. Although the following figures depict various exemplary embodiments, alternative embodiments are within the spirit and scope of the appended claims. In the drawings:

FIG. 7 illustrates a diagram of a misaligned wheel, in accordance with some embodiments.

DETAILED DESCRIPTION

The following description describes methods and systems for tire health monitoring. Wheel alignment refers to the adjustment of a vehicle's suspension, which connects a vehicle to its wheels. Wheel alignment is performed by adjusting the suspension of the vehicle to adjust the angles of the tires that relate to the position of the wheel at the contact of the road. The purpose of these adjustments is to reduce tire wear and to ensure that vehicle travel is straight and true (without "pulling" to one side). In the description herein alignment angle refers to the angle of the wheel with respect to the road. When a wheel is properly aligned, the vehicle's travel is straight without pulling to one side. When a wheel is not properly aligned, the vehicle's travel is not straight but instead pulls to one side (e.g., pulls to the left or to the right) when the vehicle is expected to be travelling in straight line (i.e., the vehicle is not turning).

Wheel balance describes the distribution of mass within a vehicle's tire or the vehicle's wheel (including the tire and the rim of the wheel). When the wheel rotates, asymmetries in its mass distribution may cause it to apply periodic forces and torques to the wheel's axle. Over time, these asymmetries in the mass or weight distribution add up to a significant imbalance of the wheel. The imbalance of the wheel can put uneven pressure on the treads of the tire, causing uneven tread wear and excess heat that shorten the life of the tire. Wheel imbalance can also strain the wheel bearings and suspension system of the vehicle.

Tread of a tire refers to the rubber on the circumference of the tire that makes contact with the road. The tire tread gives the tire its ability to grip the road, accelerate, brake and corner—and even help maximize fuel economy. As the rubber on the tread wears away, so does the tire's effectiveness. Tread depth is a vertical measurement from the top of the tire's rubber to the bottom of the tire's deepest grooves. When the tread wears away, its tread depth decreases. Over time, when the tread depth decreases, the tire become less effective at gripping the road, and if the tread has worn down too far, the tire could become a cause of accident.

In conventional approaches, wheel balance and alignment are measured in factories and repair shops. Monitoring alignment, balance, and tread depth is important in particular to fleets of vehicles. In fact, tread depth, wheel alignment and on tread depth are a crucial piece of driving safety and performance. The embodiments described herein enable an automatic way of tire health monitoring.

Overview

Figure 1:
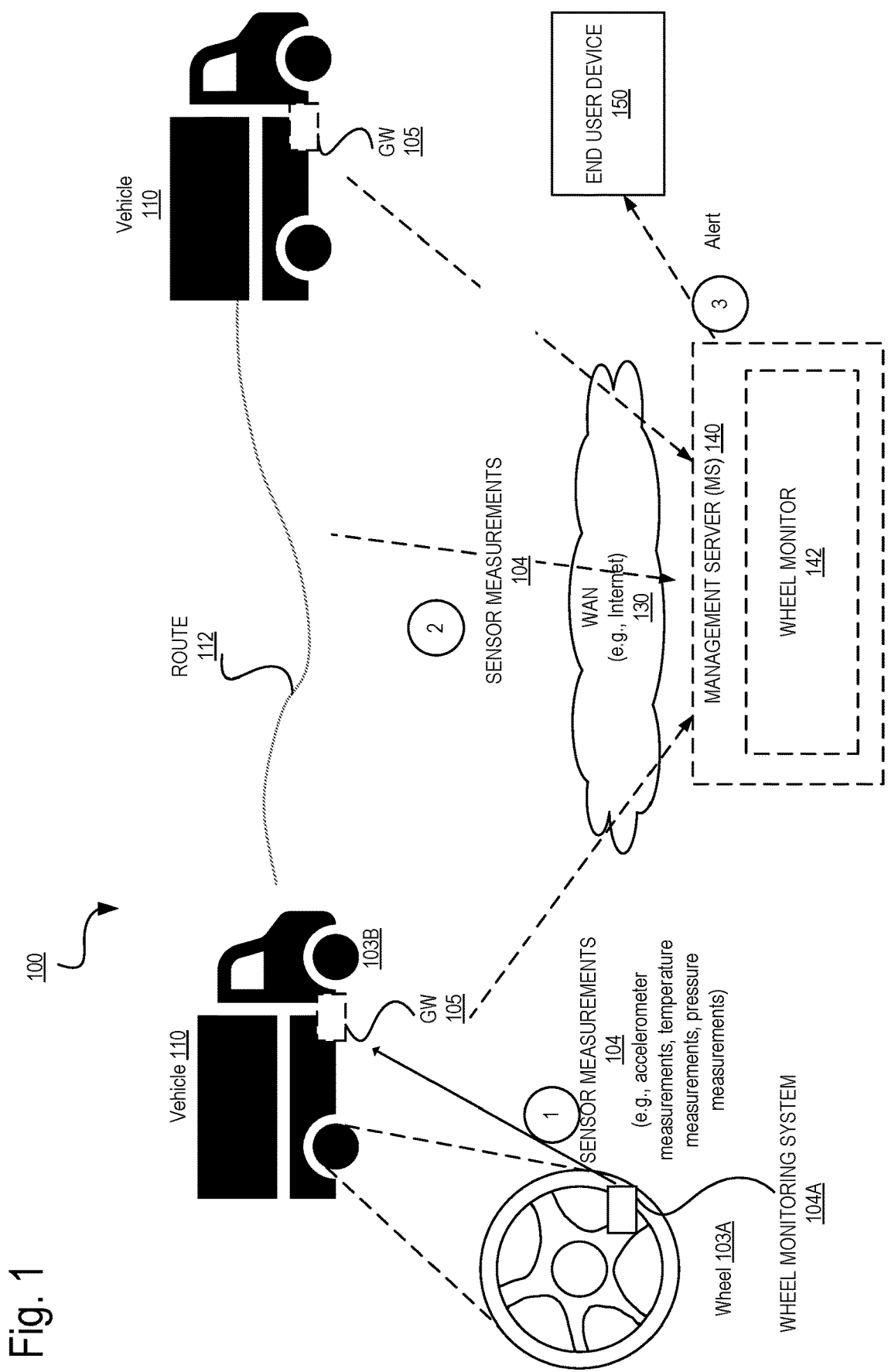
FIG. 1 illustrates a block diagram of a system that can be used for monitoring the health of a vehicle's tire, in accordance with some embodiments.

FIG. 1 illustrates a block diagram of a system 100 that can be used for monitoring the health of a vehicle's tire, in accordance with some embodiments. The system 100 includes a vehicle 102 and an optional management server 140.

The vehicle 110 can be a tractor coupled with a trailer part of a fleet used for transportation of goods. For example, the vehicle 110 can be a tractor, a tow truck, a semi-truck, a light or heavy truck or any other type of vehicle that is operative to be coupled with and pull a trailer. The vehicle can be a car, a van, a bus, a specialized vehicle, a bicycle, a motorized bike, or any other type of vehicle used for transportation of goods or persons without departing from the scope of the present invention. The vehicle 110 departs from a first location and moves along the route 112 towards a destination. In some embodiments, the vehicle 110 can be part of a fleet of vehicles operated by a fleet manager. The fleet of vehicles is managed through the management server 140. In other embodiments, the vehicle 110 is a stand alone vehicle and is not part of a fleet.

The vehicle 110 may include two or more wheels. A wheel includes a rim and a tire. For example, when the vehicle is a bicycle, the vehicle has two wheels; when the vehicle is a car, the vehicle has three to four wheels; and when the vehicle is a truck it can have four or more wheels. For example, the vehicle may include wheel 103A. In the illustrated vehicle of FIG. 1, the vehicle has four wheels, 103A-D. One or more wheels of the vehicle 110 include a wheel monitoring system 104A. The wheel monitoring system 104A is described with further detail with respect to FIG. 6. The wheel monitoring system 104A is operative to record sensor measurements (e.g., accelerometer measurements, temperature measurements, and/or pressure measurements) that relate to the wheel on which the wheel monitoring system 104A is mounted. The wheel monitoring system 104A is operative to transmit the sensor measurements (operation 1) to a gateway system 105 of the vehicle and/or to a computing device of the vehicle (not illustrated).

The vehicle 110 can further include a processing device with which the vehicle was manufactured. The processing device is an electronic device that is integrated to the vehicle and is accessible by after-market components through one or more communication interfaces. In some embodiments, the vehicle 110 includes a gateway device 105. In other embodiments, the gateway device 105 is optional. The gateway device 105 may be located inside the vehicle or outside of the vehicle 110. The gateway device 105 is an electronic device and is operative to be coupled with the management server 140 through a Wide Area Network (WAN) 130. The connection to the WAN is a wireless connection (e.g., Wi-Fi, cellular connection, etc.). In some embodiments, the gateway device 105 and the management server 140 may be subject to an intermittent connectivity with the WAN. The gateway device 105 is operative to record or obtain data related to the vehicle on which it is mounted and transmit the data to the management server 140. In some embodiments, the gateway device 105 is further operative to connect to a computing device of the vehicle 110. For example, the gateway device 105 can be coupled to the vehicle's computing device through an On-board diagnostics (OBD) port of the vehicle 110. The gateway device 105 can obtain data pertaining to events that occur in the vehicle (e.g., data related to components of the vehicle (such as the engine of the vehicle) and/or data originating from sensors located within the vehicle). The gateway device 105 is also operative to be coupled with one or more aftermarket devices (i.e., that are not installed by the vehicle's manufacturer) and which are external to the gateway device 105. These devices can include sensors and cameras operative to record data and transmit the data to the gateway device through wired or wireless connection(s). The gateway device is further operative to be coupled with the wheel monitoring systems 103A-D. The gateway device is operative to receive sensor measurements from the wheel monitoring system 103A-D. In some embodiments, the gateway device 105 is implemented as described in further details with reference to FIG. 5.

The management server 140 is a cloud-based server operative to receive data from one or more gateway devices (e.g., the gateway device 105). In some embodiments, the management server 140 is implemented as described in further details with reference to FIG. 3. In some embodiments, the management server 140 includes a wheel monitor 142. In some embodiments, the management server 140 is optional and the wheel monitor 142 can be included in the gateway device 105 or in the computing device of the vehicle.

The wheel monitor 142 receives sensor measurements recorded by one or more wheels of the vehicle 110. In some embodiments, the sensor measurements are received by the gateway device 105 from the wheel monitoring system(s) 103A-D. In some embodiments, the sensor measurements are received by the computing device of the vehicle 110. In some embodiments, the sensor measurements are received by the management server 140 from the gateway device 105. The sensor measurements are used by wheel monitor 142 to automatically detect wheel balancing, wheel alignment, and/or tread depth issues associated with one or more wheels of the vehicle 110. This determination is automatic and does not require the intervention of an observer or a mechanic (e.g., a driver of the vehicle, a manager of the site at which the vehicle is located, a mechanic at a shop, etc.) that is physically evaluating the state of the wheels of the vehicle. Further, the determination is performed based on sensor measurements recorded when the vehicle is in motion (e.g., during normal use of the vehicle) and does not require a driver of the vehicle to bring the vehicle to a garage for a maintenance service.

The system may further include an end user device 150. The end user device is a computing device (e.g., laptop, workstation, smartphone, palm top, mobile phone, tablet, etc.) capable of accessing network resources (e.g., it includes software such as web browsers or web applications that are capable of accessing network resources (e.g., HTTP client, FTP client, SSH client, Telnet client, etc.)). A user of the end user device 150 can connect to the management server 140 to access data about the wheels of the vehicle 110. In some embodiments, the user of the end user device 150 accesses a fleet management service that is provided through the management server 140 to monitor and track the vehicles. The user of the end user device 150 can be the owner of the vehicle 110 and the gateway device 105. In some embodiments, the user is an administrator of the vehicle 110 and the gateway device 105. In other embodiments, the user is a customer of a delivery service that owns the fleet of vehicles. In other embodiments, the user can be the driver of the vehicle. The user device 150 is operative to receive one or more alerts related to the wheels of the vehicle 110. An alert can include an indication that a wheel of the vehicle is imbalanced. Additionally or alternatively, the alert can include an indication that the wheels of the vehicle are misaligned. Additionally or alternatively, the alert can include an indication that the tread depth of a wheel is below an acceptable tread depth threshold.

Monitoring Balance of a Vehicle's Wheel:

The operations in the flow diagrams herein will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams. The embodiments described herein will be described with respect to the wheel monitor 142. In some embodiments, the wheel monitor can be part of the management server 140. In these embodiments, the wheel monitor may receive the sensor measurements from the gateway device 105 or from the computing device of the vehicle. In some embodiments, the wheel monitor 142 can be included in the computing device of the vehicle. In these embodiments, the wheel monitor can receive sensor measurements from the gateway device 105 or alternatively from the wheel monitoring system 104A. In some embodiments, the wheel monitor 142 can be included in the gateway device 105. In these embodiments, the wheel monitor 142 receives the sensor measurements from the wheel monitoring system 104A.

Figure 2A:
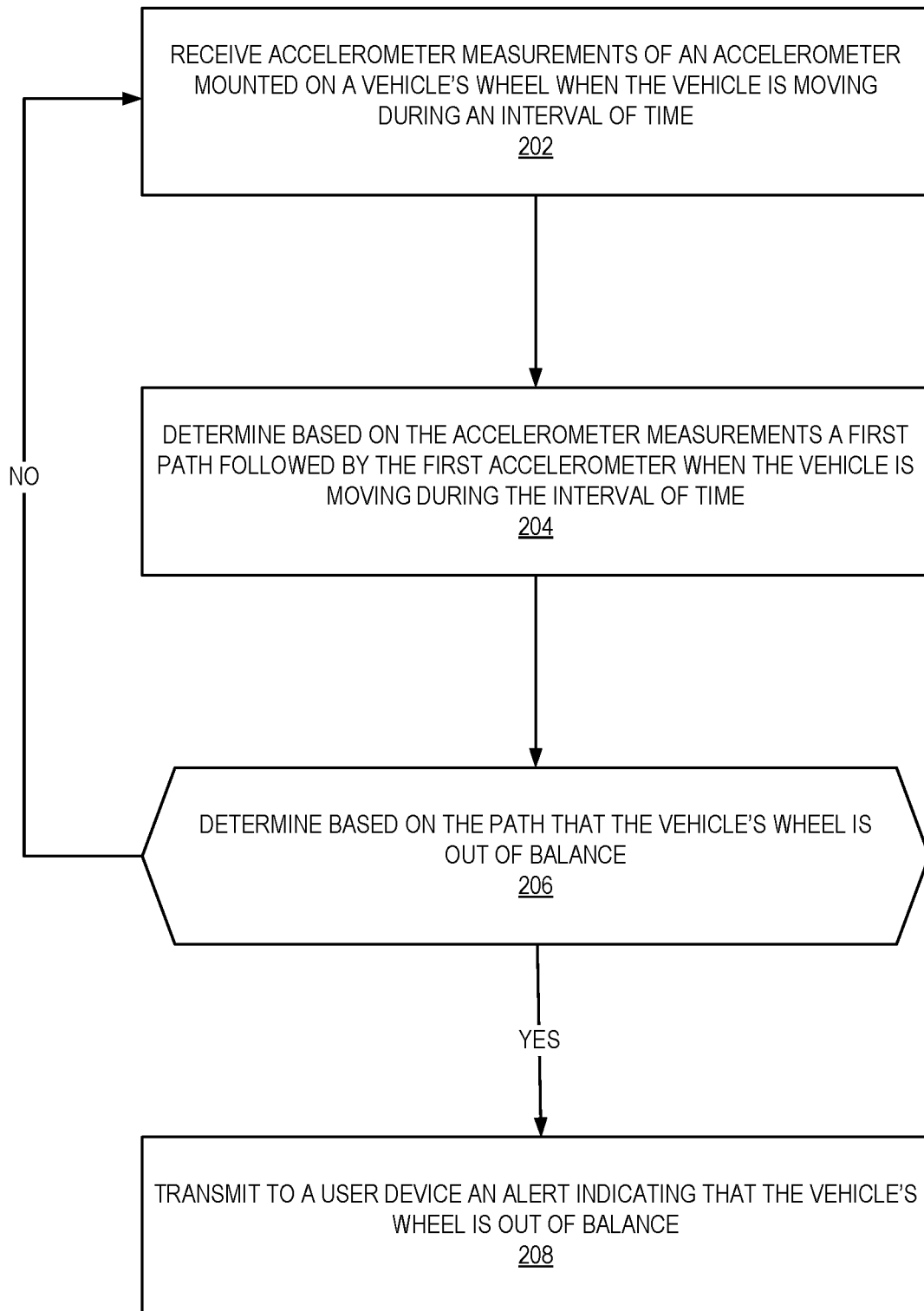
FIG. 2A illustrates a flow diagram of exemplary operations that can be performed for monitoring wheel balancing, in accordance with some embodiments.

FIG. 2A illustrates a flow diagram of exemplary operations that can be performed for monitoring balance of a wheel of a vehicle of a fleet of vehicles, in accordance with some embodiments.

At operation 202, the wheel monitor 142 receives accelerometer measurements of an accelerometer mounted on a vehicle's wheel 103A when the vehicle is moving during an interval of time. The accelerometer measurements are measurements recorded by an accelerometer of the wheel monitoring system 104A. In some embodiments, the wheel monitor 142 further receives other accelerometer measurements of accelerometers of one or more other wheel monitoring systems that are mounted on one or more other wheels of the vehicle. The other accelerometer measurements are recorded by the other accelerometers during the same interval of time. In some embodiments, the acetometer measurements can be included as part of sensor measurements recorded by the wheel monitoring system 104A, where the sensor measurements include temperature measurements and pressure measurements.

The flow moves to operation 204. At operation 204, the wheel monitor 142 determines based on the accelerometer measurements a path followed by the accelerometer when the vehicle is moving during the interval of time. The path followed by the accelerometer is a path of a point on the wheel (at the location of the accelerometer on the wheel) when the wheel is rotating during the vehicle's motion. In some embodiments, the wheel monitor 142 may determine multiple paths followed by respective accelerometer mounted on respective wheels of the vehicle when the vehicle is moving. Each path of an accelerometer mounted on a wheel of the vehicle is independent of the other paths of the other accelerometers mounted on other wheels.

The flow of operations moves to operation 206. At operation 206, the wheel monitor 142 determines based on the path that the vehicle's wheel is out of balance with respect to an axle of the vehicle's wheel. The path of the accelerometer mounted on a wheel has a shape of a cycloid, when the wheel of the vehicle is properly balanced. Alternatively, when the wheel is out of balance the path of the accelerometer mounted on the wheel has a shape of a cycloid including harmonics. The harmonics in the path of the accelerometer can be caused by the road condition and can be temporary. However, a persistent presence of the harmonics in the path are an indication that the wheel on which the accelerometer is mounted is out of balance. The path that a normal tire travels would be a circle, while the path that an out of balance tire would travel would be elliptical. In some embodiments, determining that the wheel is out of balance includes determining that the path of the movement of the vehicle's wheel is representative of sideways movement of the vehicle's wheels that caused by an irregular weight distribution in the vehicle's first wheel with respect to the axle of the vehicle's wheel. In some embodiments, determining that the wheel is out of balance further includes determining that the sideways movement of the vehicle's wheel is greater than a sideways movement threshold. Dynamic or static balancing techniques can be used to determine whether the wheel is out of balance (sideways movement (wobble) is typically associated with dynamic balancing techniques).

Upon determining that the vehicle's wheel is out of balance, the flow of operations moves to operation 208. At operation 208, the wheel monitor transmits to a user device 150 an alert indicating that the vehicle's wheel is out of balance. In some embodiments, the alert can be sent to the driver of the vehicle, the manager/supervisor of the driver, or an administrator/operator of a fleet management system. The alert can be transmitted via email, voice-message, text message, a notification on a mobile application, etc. The alert may cause the user to schedule the vehicle for maintenance to address the wheel imbalance.

Alternatively, upon determining that the vehicle's wheel is not out of balance, the flow of operations moves to operation 202. The wheel monitor 142 continues to receive accelerometer measurements recorded by the wheel monitoring system 103A and continues to monitor wheel.

Figure 2B:
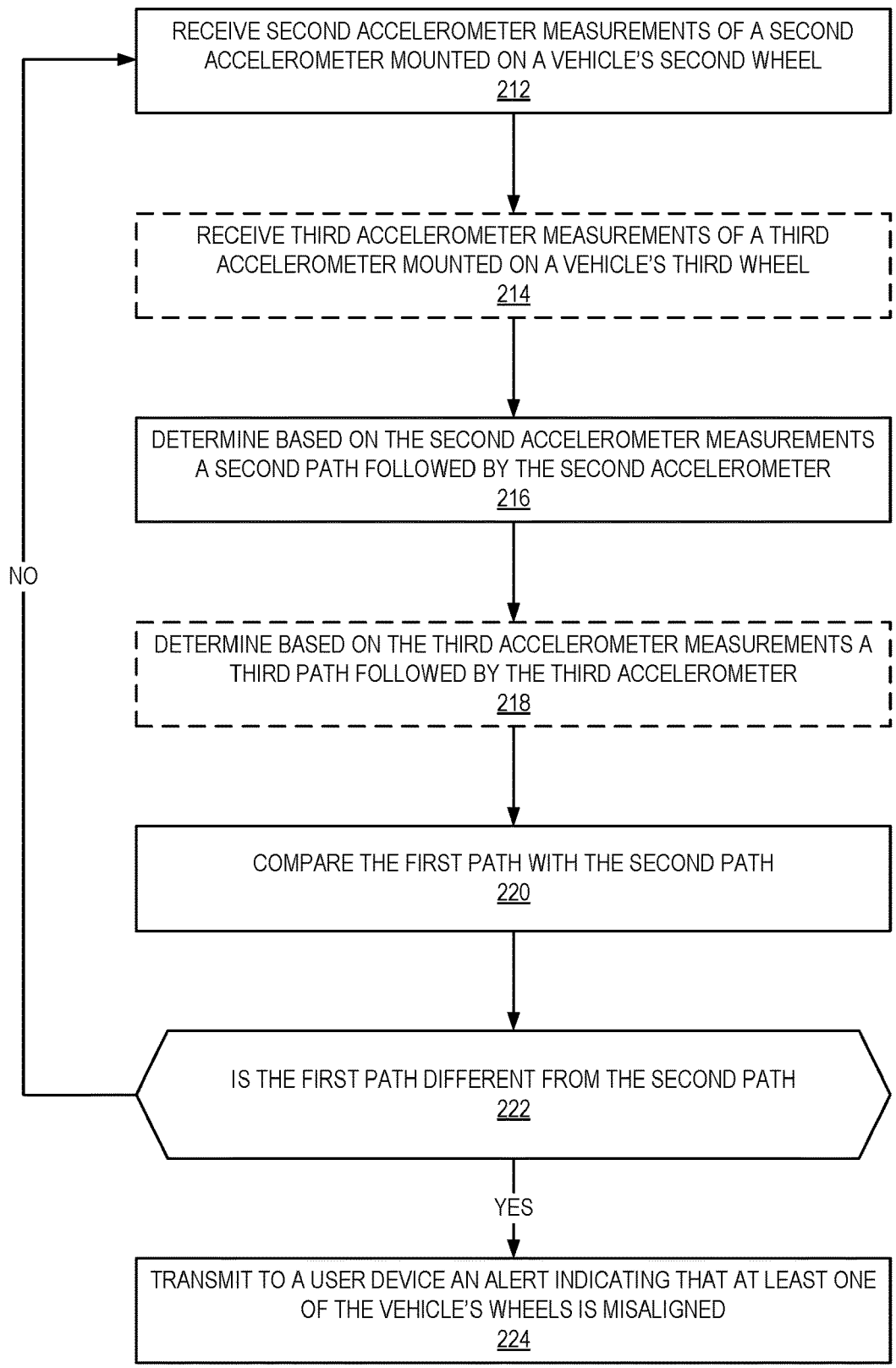
FIG. 2B illustrates a flow diagram of exemplary operations for monitoring wheel alignment, in accordance with some embodiments.

Monitoring Wheel Alignment:

FIG. 2B illustrates a flow diagram of exemplary operations for monitoring wheel alignment, in accordance with some embodiments. The wheel monitor may perform operations 202-204 for a first wheel of the vehicle. The wheel monitor receives first accelerometer measurements and determines a first path followed by the first accelerometer mounted on the first wheel of the vehicle. The wheel monitor may further perform operations 212 and 216, and optional 214 and 218, for one or more additional wheels of the vehicle. In some embodiments, the wheel monitor 142 receives accelerometer data from accelerometers mounted on each wheel of the vehicle. In other embodiments, the wheel monitor 142 receives accelerometer data from accelerometers mounted on some but not all wheels of the vehicle.

At operation 212, the wheel monitor 142 receives second accelerometer measurements of a second accelerometer mounted on a vehicle's second wheel 103B when the vehicle is moving during the interval of time. The accelerometer measurements are measurements recorded by a second accelerometer of a second wheel monitoring system 104B that is mounted on a second wheel of the vehicle that is different from the first wheel. In some embodiments, optional operation 214 can be performed for receiving third accelerometer measurements of a third accelerometer mounted on a vehicle's third wheel when the vehicle is moving during the interval of time. The accelerometer measurements are measurements recorded by a third accelerometer of a third wheel monitoring system that is mounted on the third wheel of the vehicle that is different from the first wheel.

The flow moves to operation 216. At operation 216, the wheel monitor 142 determines based on the second accelerometer measurements a second path followed by the second accelerometer when the vehicle is moving during the interval of time. The path followed by the second accelerometer is a path of a point on the second wheel (at the location of the second accelerometer on the wheel) when the second wheel is rotating during the vehicle's motion. In some embodiments, the flow can move to optional operation 218, at which a third path is determined for a third wheel of the vehicle.

The flow of operations moves to operation 220. At operation 220, the first path and the second path are compared. In some embodiments, the comparison of the first path and the second path can include identifying portions of the first path and the second path that should be substantially identical for the first wheel and the second wheel. For example, if the first wheel and the second wheel are both front wheels of a vehicle, their respective paths should be substantially identical. In another example, if the first wheel and the second wheel are back wheels of the vehicle, their respective paths should also be substantially identical. In a third example, if the first wheel and the second wheel are a front and a back wheel of the vehicle, their respective paths will be substantially the same when the vehicle is going straight but different when the vehicle is turning. In some embodiments, the comparison of the first path and the second path may include identifying whether the first wheel is a front or back wheel, and identifying whether the second wheel is a front or back wheel. The identification of whether a wheel is a front or back wheel can be performed by the wheel monitor by comparing movement of wheels over time, and/or distance traveled by a wheel. For example, when a vehicle is a truck a front wheel travels a longer distance than a back wheel. The front wheels typically travel 5-10% further than rear wheels (e.g., due to steering, the front tires travel further through a corner than the rear), and over time this difference will be noticeable. Therefore, determining a distance travelled by the first wheel during an interval of time and comparing this distance with the distance travelled by the second wheel during the same interval of time may allow to identify that one is a front wheel and the other a back wheel, or that both wheels are of the same type. In some embodiments, the identification of whether a wheel is a front or back wheel is based on the sideways acceleration (perpendicular to the plane of rotation) produced by steering of the wheels. Rear wheels are pulled through corners and do not move relative to the body of the vehicle, whereas front wheels turn. This turning force may be noticeable if all tires are fitted with a sensor and the measurements are compared. In some embodiments, the identification of back and front wheels can be received from a user that configured the system. For a vehicle 110, the user identifies a wheel that is associated with a wheel monitoring system on which it is mounted. For example, the user may identify the right back wheel of the vehicle 110 as the wheel for the wheel monitoring system 130A.

In some embodiments, comparing the first and the second paths includes 1) determining a subinterval of the second interval of time during which the vehicle is not turning; and 2) determining, based on accelerometer measurements recorded during the subinterval of the second interval of time, a difference between a first portion of the first path and a second portion of the second path, where the first portion is followed by the vehicle's first wheel during the subinterval of the second interval of time and the second portion is followed by the vehicle's second wheel during the subinterval of the second interval of time. The comparison is performed for portions of paths followed by the wheels of the vehicle when the vehicle is going straight. This allows the identification of a difference between two paths that is due to a misalignment of at least one of the wheels instead of being due to the vehicle turning.

The flow of operations moves to operation 240. At operation 240, the wheel monitor determines based on the comparison of the first path and the second path that at least one of the first and second wheels is not properly aligned. In some embodiments, the comparison of the two paths may not allow to identify which of the wheel is misaligned. In other embodiments, the comparison of the paths may allow the identification of which wheel is misaligned. In some embodiments, paths of multiple wheels allow the identification of the misaligned wheel. For example, if the wheel monitor 142 obtains sensor measurements of three wheels, it may identify that one out of the three is misaligned if the path of the misaligned wheel is different from the paths of the two others, and the paths of the two others are substantially identical. When a vehicle accelerates in a straight line, all four wheels should experience that acceleration in the same plane as their rotation. A misaligned wheel will experience that acceleration at an angle with respect to its rotation, for example, as shown in FIG. 7 (in which the arrows represent the direction of acceleration for each wheel).

While the embodiments herein will be described with respect to a first wheel and a second wheel where the two wheels are different, in other embodiments, the embodiments can be performed where a second wheel is a same wheel with a second path that occurred during a different interval of time than the interval of time for the first path. In these embodiments, a first path of a wheel is compared with a second path of the wheel that is derived from earlier sensor measurements received from the same wheel monitoring system. As described above, portions of the paths where the vehicle is not turning are compared. When a difference is determined between the first path and the second path, it is an indication that the wheel is now out of alignment when compared to an earlier time interval. In some embodiments, the forward acceleration of the vehicle as it increases speed is observed. Most of the time, the forward acceleration (as detected by an accelerometer) is expected to be in line with the plane of rotation of the wheel (expect when the vehicle is turning). Thus, the wheel may be determined to be misaligned if the forward acceleration is not in line with the plane of rotation of the wheel for most of the time (and particularly when the vehicle is not turning).

Upon determining that at least a wheel is misaligned, the flow of operations moves to operation 242. At operation 242, the wheel monitor 142 transmits an alert to a user. The alert indicates that the wheels are misaligned. In some embodiments, the alert further identifies the wheel that is misaligned. Upon determining that no wheel is misaligned, the flow of operations moves to operation 232, at which the wheel monitor 142 continues to receive sensor measurements and monitor wheels of a vehicle for misalignment.

Monitoring Tread Depth

Figure 2C:
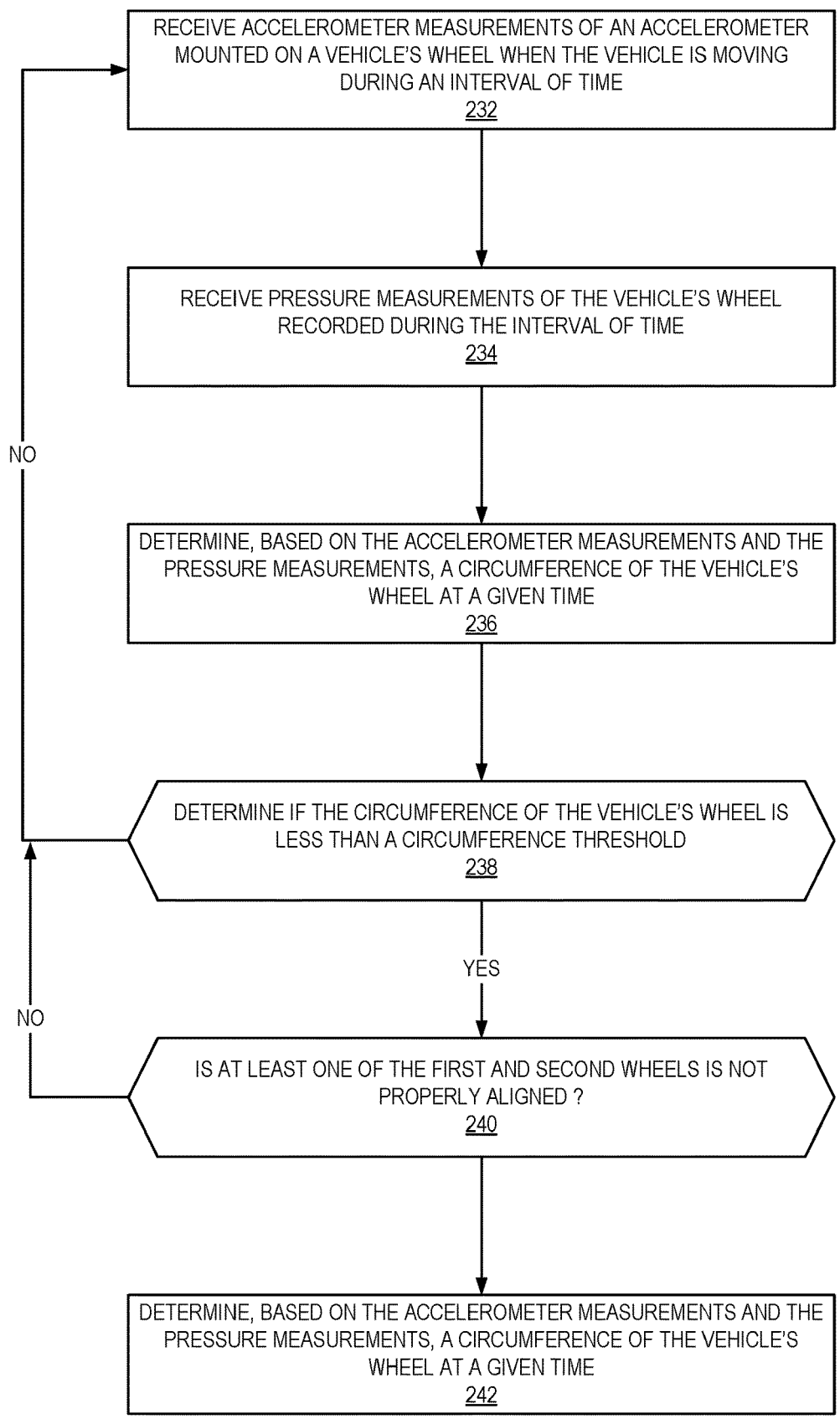
FIG. 2C illustrates a flow diagram of exemplary operations that can be performed for monitoring tread depth of a wheel of a vehicle, in accordance with some embodiments.

FIG. 2C illustrates a flow diagram of exemplary operations that can be performed for monitoring tread depth of a wheel of a vehicle, in accordance with some embodiments. At operation 232, the wheel monitor 142 receives accelerometer measurements of an accelerometer mounted on the vehicle's wheel 103A when the vehicle is moving during an interval of time. The receipt of the accelerometer measurements is performed as described with respect to operation 202 of FIG. 2A.

The flow of operations moves to operation 234. At operation 234, the wheel monitor 142 receives pressure measurements of the vehicle's wheel recorded during the interval of time. The pressure measurements are measurements recorded by a pressure sensor of the wheel monitoring system 104A. In some embodiments, the wheel monitor 142 may further receive other pressure measurements of pressure sensors included in one or more wheel monitoring systems that are mounted on one or more other wheels of the vehicle. These pressure measurements are recorded by the other pressure sensors during the same interval of time. In some embodiments, the pressure measurements can be included as part of sensor measurements recorded by the wheel monitoring system 104A, where the sensor measurements include temperature measurements and accelerometer measurements. In some embodiments, in addition to the pressure measurements, the wheel monitor 142 may further receive temperature measurements of the vehicle's wheel recorded during the interval of time. The wheel monitor 142 may further receive other temperature measurements of one or more wheel monitoring systems that are mounted on one or more other wheels of the vehicle.

The flow of operations moves to operation 236. At operation 236, the wheel monitor 142 determines, based on the accelerometer measurements and the pressure measurements recorded during the interval of time, a circumference of the vehicle's wheel at a first time. The circumference of a wheel may be obtained using an outside data source in combination with an accelerometer. Knowing vehicle speed (e.g., either via OBD-II or GPS in a hub device) in combination with the period of rotation of the tire (from an accelerometer) may give the circumference of the wheel. In some embodiments, determining the circumference of the vehicle's wheel is further performed based on the temperature measurements of the vehicle's wheel during the interval of time. Temperature and pressure both significantly affect the tire circumference (e.g., by 5-10%). There will be a predictable relationship which could be compensated for by experimenting or developing a formula. Once a formula is developed, the circumference may be determined using the formula for different temperatures and pressure levels. In some embodiments, the wheel monitor 142 can determine multiple circumference values of the vehicle's wheel based on pairs of (accelerometer measurement, pressure measurement) for the interval of time. In some embodiments, the temperature measurements are also taken into consideration in the determination of the multiple circumference values. In these embodiments, the circumference values are determined based on sets of triples (accelerometer measurement, pressure measurement, temperature measurement). In some embodiments, the determination of the circumference of the wheel of the vehicle may further take into account the speed of the vehicle. The speed can be obtained from the accelerometer measurements, or from the vehicle itself (from the computing device of the vehicle). The determination of the circumference can also be based on the condition of the road on which the vehicle is moving. In some embodiments, the circumference of the vehicle's wheel at the given time is determined from the multiple circumference values. For example, a smallest circumference value is selected from the multiple circumference values (e.g., min of circumference values over the interval of time). In this embodiment, the time of the circumference value is determined from the time at which the sensor measurements are recorded. In another example, an average circumference value is calculated from the multiple circumference values calculated for the interval of time. In this embodiment, the time of the circumference value can be the time of a latest recorded value, or a range representing the interval of time over which the circumference values are averaged. Road conditions may play a part when determining the circumference of a wheel (especially bumpy surfaces). Any calculation of circumference, balance, and alignment may have to be done over long enough time scales to average out the impacts of road condition.

The flow of operations moves to operation 238. At operation 238, the wheel monitor 142, determines that the circumference of the vehicle's wheel is less than a circumference threshold. The circumference threshold can be set for the vehicle's wheels based on the tire's make. The threshold circumference is the minimum size of the circumference acceptable for a wheel of the vehicle. When the circumference is less than the circumference threshold, the wheel has too much wear and need to be replaced. In some embodiments, the wheel monitor 142 determines a tread depth based on the circumference. For example, this could be done by comparing the circumference to a previous circumference for the same wheel, where the difference in circumference can be calculated to determine the tread depth decrease. The tread depth decrease or the tread depth (which may be calculated by taking a previously known tread depth and subtracting from it the tread depth decrease amount) may then be compared to a threshold or range of acceptable values.

Responsive to determining that the circumference is less than the circumference threshold, the flow of operation moves to operation 240. At operation 240, the wheel monitor transmits to a user device 150 an alert indicating that a tread depth of a tire of the vehicle's first wheel has decreased. In some embodiments, the alert includes an identification of the tire that needs attention. A decrease circumference of the wheel is an indication of the wear of the tread of the wheel and therefore is an indication that the tread depth of the tire has decreased. This indication can be used by the user to schedule a replacement of the identified tire. Alternatively, responsive to determining that the circumference is not less than the circumference threshold, the flow of operations moves to operation 232. The wheel monitor continues to monitor the tread depth of the wheel.

In some embodiments, a wheel monitor 142 is operative to monitor one of wheel balancing, wheel alignment, or tread depth of the wheels of a vehicle. In some embodiments, the wheel monitor 142 is operative to perform any combination of two or more of wheel balancing monitoring, wheel alignment monitoring, and tread depth monitoring. The operations described above can be performed in combination or independently without departing from the scope of the present embodiments. In some embodiments, the wheel monitor can be operative to perform all of the monitoring related to wheels of a vehicle (e.g., wheel balance monitoring, wheel alignment monitoring, and tread depth monitoring) but may select one of the sets of operations according to the data received from the wheel monitoring system(s) mounted on the wheels of the vehicle, and/or according to the data received from the vehicle's computing system.

Exemplary Electronic Devices
Electronic Device and Machine-Readable Media

One or more parts of the above embodiments may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off, or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long-term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to other electronic device(s) (sometimes referred to as a client electronic device, a client computing device, or a client device) that executes client software (sometimes referred to as client code or an end-user client) to communicate with the service. The server and client electronic devices may be operated by users respectively in the roles of administrator (also known as an administrative user) and end-user.

Alternative embodiments of an electronic device may have numerous variations from that described above. For example, customized hardware and/or accelerators might also be used in an electronic device.

Exemplary Environment

The gateway device, the wheel monitoring system, the user device, and the management server described with reference to FIGS. 1-6 are electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 3:
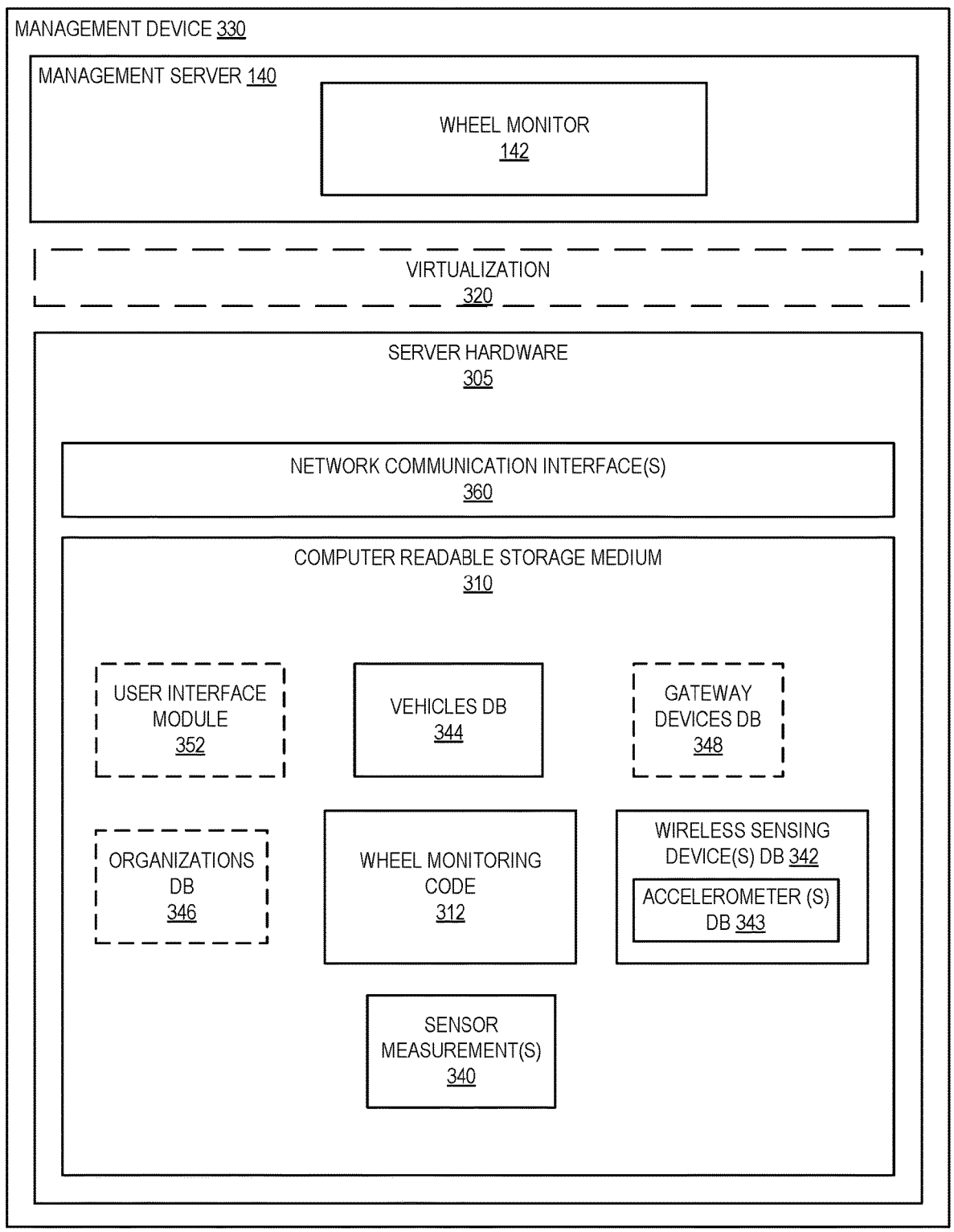
FIG. 3 illustrates a block diagram for an exemplary server management that can be used in some embodiments.

FIG. 3 illustrates a block diagram for an exemplary server management that can be used in some embodiments. The management server 140 may be a Web or cloud server, or a cluster of servers, running on server hardware. In one embodiment, the management server 140 works for both single and multi-tenant installations, meaning that multiple organizations with different administrators may have wheel monitoring systems, wireless sensing devices, and/or gateway devices managed by the same management server.

According to one embodiment, management server 140 is implemented on a server device 330, which includes server hardware 305. Server hardware 305 includes network communication interfaces 360 coupled with a computer readable storage medium 310. The computer readable storage medium 310 includes wheel monitoring code 312. The computer readable storage medium 310 includes sensor measurements 340A (including accelerometer measurements, temperature measurements, and/or pressure measurements), wireless sensing device(s) database (which may include information regarding accelerometers, or other sensing devices), vehicles database 344 (including information regarding the vehicles that includes information regarding the wheels of the vehicle), an optional organizations database 346 (including information regarding the organizations to which the gateway devices, or the vehicles belong); an optional gateway devices database 348 (including information regarding the gateway devices).

While one embodiment does not implement virtualization, alternative embodiments may use different forms of virtualization—represented by a virtualization layer 320. In these embodiments, the management server 140 and the hardware that executes it form a virtual management server, which is a software instance of the modules stored on the computer readable storage medium 310.

Figure 4:
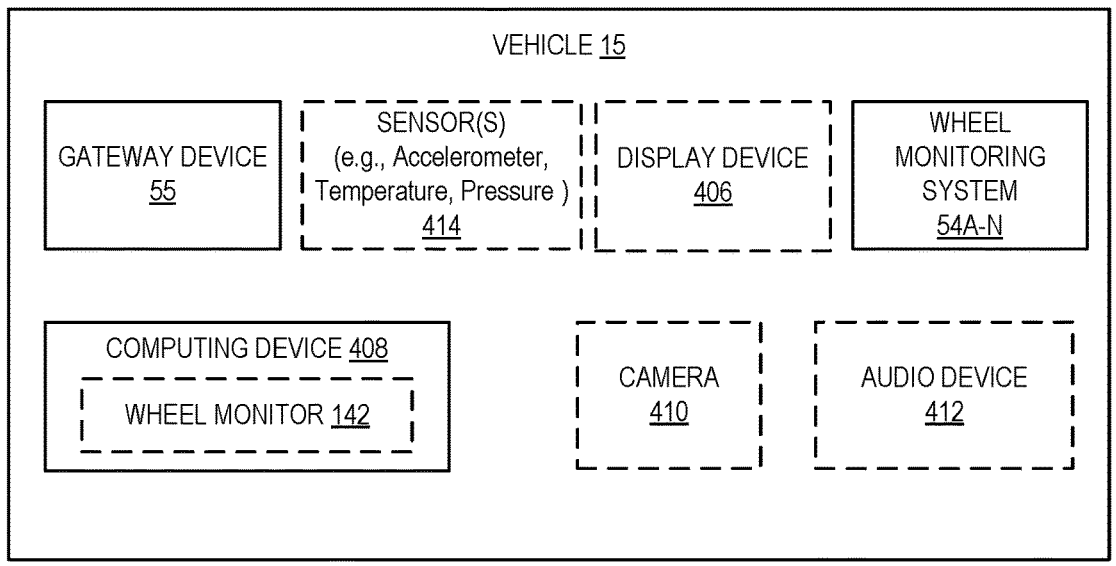
FIG. 4 illustrates a block diagram of an exemplary vehicle that can be used in some embodiments.

FIG. 4 illustrates a block diagram of an exemplary vehicle that can be used in some embodiments. Vehicle 110 includes a computing device 408. The computing device is an electronic device installed by the manufacturer of the vehicle. The computing device may include wheel monitor 142. The wheel monitor is operative to perform operations as described with reference to FIGS. 2A-C for monitoring wheels of the vehicle 110. The vehicle 110 may include one or more sensors that can be installed by the manufacturer of the vehicle or aftermarket sensors. The sensors are electronic devices operative to record and transmit data through the gateway device 105 towards the management server. The vehicle may further include a camera 410, a display device 406, and an audio device 412. The display device 406 and the audio device 412 can be used to present alerts to a driver of the vehicle. In some embodiments, the vehicle includes one or more wheel monitoring systems 104A-N. A wheel monitoring system from the system 104A-N is mounted on a wheel of the vehicle. The wheel monitoring system can be implemented as described in further detail below with respect to FIG. 6.

Figure 5:
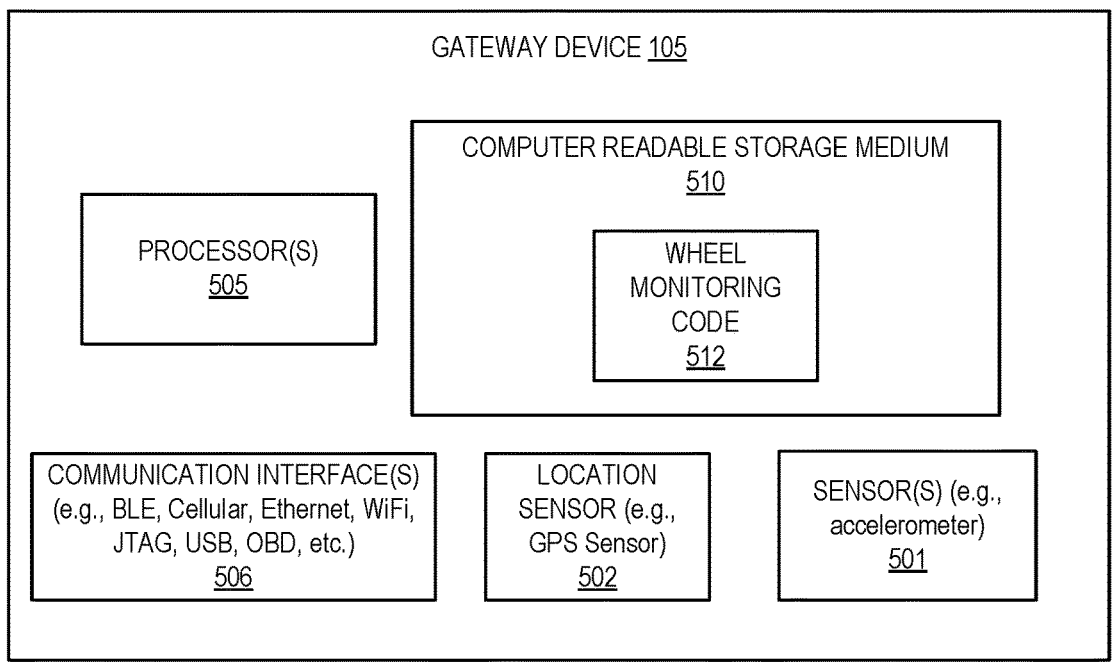
FIG. 5 illustrates a block diagram of an exemplary gateway device that can be used in some embodiments.

FIG. 5 illustrates a block diagram of an exemplary gateway device that can be used in some embodiments. Gateway device 105 includes one or more processors 105 and connected system components (e.g., multiple connected chips). The gateway device 105 includes computer readable storage medium 510, which is coupled to the processor(s) 505. The computer readable storage medium 510 may be used for storing data, metadata, and programs for execution by the processor(s) 505. For example, the depicted computer readable storage medium 510 may store wheel monitoring code 512 that, when executed by the processor(s) 505, causes the gateway device 105 to perform operations as described with FIG. 2A-C. In some embodiments, the computer readable storage medium 510 may store code, that when executed by the processor(s) 505, causes the gateway device to receive sensor measurements from the wheel monitoring system 103A and/or the computing device of the vehicle and transmit the data to the management server 104. The gateway device may further receive data from the management 104 and is operative to configure the wheel monitoring systems.

The gateway device 105 also includes one or more sensors used to record sensor measurements in response to physical events. For example, the gateway device 105 may include a location sensor (such as a GPS sensor) 502 for recording location measurements to indicate the location of the vehicle on which the gateway device is mounted. The gateway device 105 may include one or more other sensors 501 (e.g., an accelerometer, a temperature sensor, a pressure sensor, etc.).

The devices installed by the vehicle's manufacturer can be coupled with the vehicle's computing device through a wired or a wireless connection to transmit data. In some embodiments, the gateway device 105 may obtain data based on sensor measurements or image data generated by these devices through the computing device of the vehicle (e.g., through an on-board diagnostics (OBD) by which the gateway device 105 is coupled to the vehicle's computing device). In other embodiments, the gateway device 105 may be operative to communicate directly with the devices.

The gateway device 105 also includes one or more communication interfaces 506, which are provided to allow a user to provide input to, receive output from, and otherwise transfer data to and from the system. Exemplary Input/ Output devices and interfaces 1206 include wired and wireless transceivers, such as Joint Test Action Group (JTAG) transceiver, a Bluetooth Low Energy (LE) transceiver, an IEEE 802.11 transceiver, an infrared transceiver, a wireless cellular telephony transceiver (e.g., 2G, 3G, 4G), or another wireless protocol to connect the gateway device 105 with another device, external component, or a network and receive stored instructions, data, tokens, etc. It will be appreciated that one or more buses may be used to interconnect the various components shown in FIG. 10.

It will be appreciated that additional components, not shown, may also be part of the gateway device 105, and, in certain embodiments, fewer components than that shown in FIG. 10 may also be used in a gateway device 105.

Figure 6:
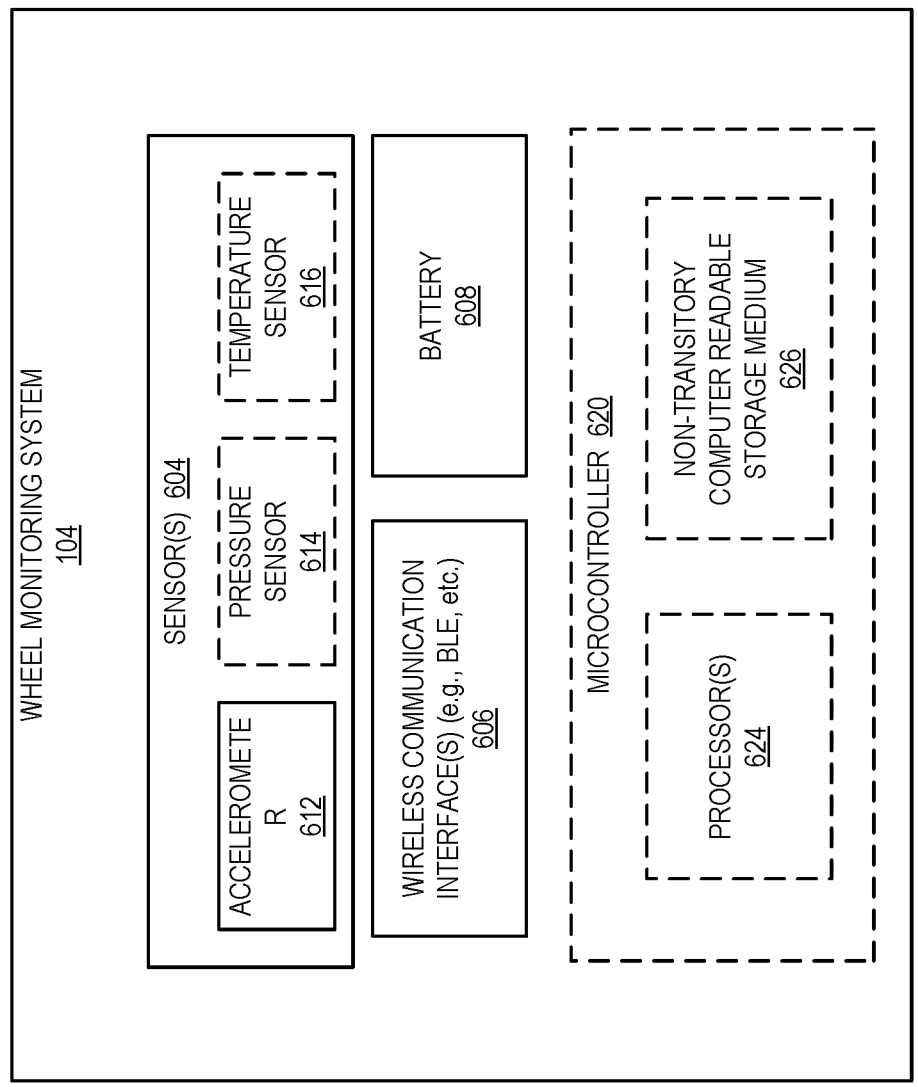
FIG. 6 illustrates a block diagram of an exemplary wheel monitoring system, in accordance with some embodiments.

FIG. 6 illustrates a block diagram of an exemplary wheel monitoring system, in accordance with some embodiments. The wheel monitoring system 104 includes one or more sensors 604, a wireless communication interface 606, and a battery 608. In some embodiments, the wheel monitoring system can further include one or more processors 624 and a non-transitory computer readable storage medium 626, which can form a microcontroller 620. The sensors 604 can include an accelerometer 612, an optional pressure sensor 614, and an optional temperature sensor 616. Each one of the sensors 604 is a high sensitive sensor and provides high precision sensor measurements that can be used for determining the health of the wheel of a vehicle, and identifying slight variation in an alignment angle, balance of a wheel, or tread depth of a wheel's tire. The sensors are quick to detect or respond to slight changes, signals, or influences.

The accelerometer 612 is an electromechanical device that measures acceleration forces. Such forces may be static, such the force of gravity or dynamic to sense movement or vibrations. An accelerometer 612 records accelerometer measurements, which can be used to determine the movement or vibration of the object (e.g., vehicle) on which the wheel monitoring system 414 is mounted. The temperature sensor measures the temperature of the air in the tire of the wheel and outputs temperature measurements. One or more temperature measurements can be output during the interval of time depending on the sampling frequency configured for the temperature sensor. The pressure sensor measures the pressure of the air in the tire of the wheel and outputs pressure measurements. On or more pressure measurements can be output during the interval of time sampling frequency configured for the pressure sensor. In some embodiments, the sensor measurements are continuously sampled and transmitted through the communication interface to an external electronic device (e.g., the microcontroller 620 of the wheel monitoring system, the gateway device 105, and/or the computing device of the vehicle). Alternatively, the sensor measurements are continuously sampled by the sensors and stored in the microcontroller 620 to be transmitted out of the wheel monitoring system few times a day (e.g., once a day, twice a day, etc.).

The battery 608 provides power for operation of the wheel monitoring system 414. The battery 608 can a non-rechargeable battery or a rechargeable battery. In some embodiments, the life expectancy of the non-rechargeable battery approaches life expectancy of a tire of the wheel on which the wheel monitoring system 414 is mounted. In some embodiments, a rechargeable battery can be self-powered by the movement of wheel.

The wireless communication interface 606 provides wireless connectivity to the wheel monitoring system 414 and enables the wireless transmission of the sensor measurements recorded by the sensors from the wheel monitoring system 414 to another electronic device through. The electronic device can be a gateway device located on the vehicle. In some embodiments, the wireless communication interface enables a reliable and cost effective transmission of data to and from the wheel monitoring system 414. In some embodiments, the wireless communication interface is a very low power consumption component. For example, Bluetooth Low Energy (BLE) can be used as a communication protocol of the wireless communication interface 606. In some embodiments, the wireless communication interface 606 transmits the sensor measurements directly from the sensors as these measurements are recorded. Additionally or alternatively, the sensor measurements can be stored in the non-transitory computer readable storage medium 626 for an interval of time and then transmitted out of the wheel monitoring system 414 as a bulk of data in one or multiple transmissions a day.

The wheel monitoring system 414 is mounted on a wheel of the vehicle. For example, the wheel monitoring system can be mounted on the rim of the vehicle. In another example, the wheel monitoring system 414 can be mounted (e.g., screwed) on a valve stem of the wheel's tire. In some embodiments, the wheel monitoring system 414 can be mounted on the vehicle's wheels at the time of manufacture of the vehicle. In other embodiments, the wheel monitoring system 414 can be an after-market solution that can be purchased to be added to the vehicle after its manufacture. For example, the after-market solution wheel monitoring system can be provided as part of a fleet management service for monitoring wheels of vehicles of a fleet. In some embodiments, the components of the wheel monitoring system 414 can be included in a single device, packaged as a lightweight hardware that can be mounted on the wheel without affecting the trajectory or movement of wheel. In another embodiments, the multiple components of the wheel monitoring system 414 can be packaged in different combinations. For example, a first device can include the accelerometer 612, the communication interface 606, and the battery 608; and one or more devices can include the temperature sensor and/or the pressure sensor. For example, the temperature sensor and the pressure sensor can be part of a temperature sensor monitoring system (TPMS) already present in the vehicle (e.g., provided by the vehicle's manufacturer). The TPMS system utilizes sensor(s) within a transmitter device that measures tire pressure and temperature and sends that information wirelessly to a receiver device in the vehicle's body. While some components of the gateway device, or the management server are illustrated as code stored on the computer readable storage medium, in other embodiments the modules may be implemented in hardware or in a combination of hardware and software. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

CONCLUSION

In the above description, numerous specific details such as resource partitioning/sharing/duplication embodiments, types and interrelationships of system components, and logic partitioning/integration choices are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary embodiments in the other figures. However, the operations of the flow diagrams can be performed by embodiments other than those discussed with reference to the other figures, and the embodiments discussed with reference to these other figures can perform operations different from those discussed with reference to the flow diagrams.

While the above description includes several exemplary embodiments, those skilled in the art will recognize that the invention is not limited to the embodiments described and can be practiced with modification and alteration within the spirit and scope of the appended claims. The description is thus illustrative instead of limiting.

What is claimed is:

1. A method of monitoring one or more wheels of a vehicle, the method comprising:
   receiving first accelerometer measurements of a first accelerometer mounted on the vehicle's first wheel when the vehicle is moving during an interval of time;
   determining based on the first accelerometer measurements a first path followed by the first accelerometer when the vehicle is moving during the interval of time;
   determining based on the first path that the vehicle's first wheel is out of balance with respect to an axle of the vehicle's first wheel; and
   responsive to determining that the vehicle's first wheel is out of balance, transmitting to a user device a first alert that the vehicle's first wheel is out of balance.

2. The method of claim 1, wherein the determining that the vehicle's first wheel is out of balance with respect to the axle of the vehicle's first wheel includes:
   determining that the path of followed by the first accelerometer is representative of sideways movement of the vehicle's first wheel caused by an irregular weight distribution in the vehicle's first wheel with respect to the axle.

3. The method of claim 2, wherein the determining that the vehicle's first wheel is out of balance with respect to the axle of the vehicle's first wheel includes:
   determining that the sideways movement of the vehicle's first wheel is greater than a sideways movement threshold.

4. The method of claim 1 further comprising:
   receiving second accelerometer measurements of a second accelerometer mounted on a vehicle's second wheel when the vehicle is moving during the interval of time;
   determining, based on the second accelerometer measurements, a second path followed by the second accelerometer when the vehicle is moving during the interval of time;
   determining based on a comparison of the first path with the second path that at least one of the vehicle's first wheel and the vehicle's second wheel is not properly aligned; and
   responsive to the at least one of the vehicle's first wheel and the vehicle's second wheel not being properly aligned, transmitting to the user device a second alert indicating the misalignment of at least one of the vehicle's first wheel and the vehicle's second wheel.

5. The method of claim 4, wherein the comparison of the first path with the second path includes:
determining a subinterval of the interval of time during which the vehicle is not turning; and
determining, based on accelerometer measurements recorded during the subinterval of the interval of time, a difference between a first portion of the first path and a second portion of the second path, wherein the first portion is followed by the vehicle's first wheel during the subinterval of the interval of time and the second portion is followed by the vehicle's second wheel during the subinterval of the interval of time.

6. The method of claim 1 further comprising:
receiving pressure measurements of the vehicle's first wheel recorded during the interval of time;
determining, based on the first accelerometer measurements and the pressure measurements, a first circumference of the vehicle's first wheel at a first time;
determining that the first circumference of the vehicle's first wheel is less than a circumference threshold; and
responsive to determining that the first circumference is less than the circumference threshold, transmitting to a user device a third alert indicating that a tread depth of a tire of the vehicle's first wheel has decreased.

7. The method of claim 6, wherein the determining the first circumference of the vehicle's first wheel at a first time is further based on temperature measurements of the vehicle's first wheel recorded during the interval of time.

8. The method of claim 6, wherein the determining the first circumference of the vehicle's first wheel at a first time is further based on a speed of the vehicle during the interval of time.

9. The method of claim 6, wherein the determining the first circumference of the vehicle's first wheel at a first time is further based on conditions of a road on which the vehicle moves during the interval of time.

10. The method of claim 6, wherein the circumference threshold is determined based on a make of the tire of the vehicle's first wheel.

11. A non-transitory machine-readable storage medium that provides instructions that, if executed by a processor will cause said processor to perform operations comprising:
receiving first accelerometer measurements of a first accelerometer mounted on the vehicle's first wheel when a vehicle is moving during an interval of time;
determining based on the first accelerometer measurements a first path followed by the first accelerometer when the vehicle is moving during the interval of time;
determining based on the first path that the vehicle's first wheel is out of balance with respect to an axle of the vehicle's first wheel; and
responsive to determining that the vehicle's first wheel is out of balance, transmitting to a user device a first alert that the vehicle's first wheel is out of balance.

12. The non-transitory machine-readable storage medium of claim 11, wherein the determining that the vehicle's first wheel is out of balance with respect to the axle of the vehicle's first wheel includes:
determining that the path of followed by the first accelerometer is representative of sideways movement of the vehicle's first wheel caused by an irregular weight distribution in the vehicle's first wheel with respect to the axle.

13. The non-transitory machine-readable storage medium of claim 12, wherein the determining that the vehicle's first wheel is out of balance with respect to the axle of the vehicle's first wheel includes:
determining that the sideways movement of the vehicle's first wheel is greater than a sideways movement threshold.

14. The non-transitory machine-readable storage medium of claim 11, wherein the operations further comprise:
receiving second accelerometer measurements of a second accelerometer mounted on a vehicle's second wheel when the vehicle is moving during the interval of time;
determining, based on the second accelerometer measurements, a second path followed by the second accelerometer when the vehicle is moving during the interval of time;
determining based on a comparison of the first path with the second path that at least one of the vehicle's first wheel and the vehicle's second wheel is not properly aligned; and
responsive to the at least one of the vehicle's first wheel and the vehicle's second wheel not being properly aligned, transmitting to the user device a second alert indicating the misalignment of at least one of the vehicle's first wheel and the vehicle's second wheel.

15. The non-transitory machine-readable storage medium of claim 14, wherein the comparison of the first path with the second path includes:
determining a subinterval of the interval of time during which the vehicle is not turning; and
determining, based on accelerometer measurements recorded during the subinterval of the interval of time, a difference between a first portion of the first path and a second portion of the second path, wherein the first portion is followed by the vehicle's first wheel during the subinterval of the interval of time and the second portion is followed by the vehicle's second wheel during the subinterval of the interval of time.

16. The non-transitory machine-readable storage medium of claim 11, wherein the operations further comprise:
receiving pressure measurements of the vehicle's first wheel recorded during the interval of time;
determining, based on the first accelerometer measurements and the pressure measurements, a first circumference of the vehicle's first wheel at a first time;
determining that the first circumference of the vehicle's first wheel is less than a circumference threshold; and
responsive to determining that the first circumference is less than the circumference threshold, transmitting to a user device a third alert indicating that a tread depth of a tire of the vehicle's first wheel has decreased.

17. The non-transitory machine-readable storage medium of claim 16, wherein the determining the first circumference of the vehicle's first wheel at a first time is further based on temperature measurements of the vehicle's first wheel recorded during the interval of time.

18. The non-transitory machine-readable storage medium of claim 16, wherein the determining the first circumference of the vehicle's first wheel at a first time is further based on a speed of the vehicle during the interval of time.

19. The non-transitory machine-readable storage medium of claim 16, wherein the determining the first circumference of the vehicle's first wheel at a first time is further based on conditions of a road on which the vehicle moves during the interval of time.

20. The non-transitory machine-readable storage medium of claim 16, wherein the circumference threshold is determined based on a make of the tire of the vehicle's first wheel.

* * * * *